United States Patent [19]

Vargiu et al.

[11] 4,263,195

[45] Apr. 21, 1981

[54] MOULDING COMPOSITIONS INCLUDING A MIXTURE OF TWO POLYESTERS

[75] Inventors: Silvio Vargiu, Como; Pietro Paparatto, Milan; Antonio Parodi, Monza, all of Italy

[73] Assignee: Euteco S.p.A., Milan, Italy

[21] Appl. No.: 35,049

[22] Filed: May 1, 1979

[51] Int. Cl.³ .......................... C08K 5/12; C08K 5/17; C08L 67/06
[52] U.S. Cl. .......................... 260/31.8 XA; 260/32.6 R; 260/40 R
[58] Field of Search .................. 260/860, 861, 40 R, 260/22 CB, 31.8 XA, 32.6 R; 525/44, 46

[56] References Cited

U.S. PATENT DOCUMENTS

| | | | |
|---|---|---|---|
| 3,736,278 | 5/1973 | Wada et al. | 260/861 X |
| 3,909,483 | 9/1975 | Hindersinn et al. | 260/861 X |
| 3,994,853 | 11/1976 | Hindersinn et al. | 525/44 X |
| 4,069,193 | 1/1978 | Vargiu et al. | 260/860 X |
| 4,076,767 | 2/1978 | Samejima | 260/861 X |
| 4,077,939 | 3/1978 | Paparatto et al. | 260/860 X |
| 4,172,059 | 10/1979 | Atkins et al. | 260/22 CB |

*Primary Examiner*—Lewis T. Jacobs
*Assistant Examiner*—Robert E. L. Sellers
*Attorney, Agent, or Firm*—Sughrue, Rothwell, Mion, Zinn and Macpeak

[57] ABSTRACT

Moulding composition comprising from 10 to 50% by weight of a mixture of a first polyester obtained by polycondensation of an alkylene glycol with maleic and/or fumaric acid and a second polyester obtained by polycondensation of an alkylene glycol with an aromatic dicarboxylic acid or a mixture thereof with maleic and/or fumaric acid, the first polyester being present in an amount of from 5 to 50 parts by weight for each 100 parts by weight of the sum of the first and second polyesters, from 0.2 to 2% by weight of an organic peroxide having a decomposition temperature above 70° C., and one or more inert fillers.

The composition can be formed into free-flowing granules, free from a tendency to agglomerate, and can be moulded by injection moulding like thermoplastic materials.

12 Claims, No Drawings

MOULDING COMPOSITIONS INCLUDING A MIXTURE OF TWO POLYESTERS

The present invention relates to moulding compositions including a mixture of two polyesters and the moulded products obtained from these compositions.

Unsaturated polyester resins consisting of the products of the polycondensation of polybasic unsaturated acids with polyhydric alcohols, in solution in styrene or another unsaturated liquid monomer, are known in the art.

These resins harden under the action of catalysts such as organic peroxides, possibly used in combination with polymerisation accelerants such as, for example, cobalt naphthenate or octoate.

The main use of unsaturated polyester resins is in combination with fibrous reinforcers for the preparation of manufactured products commonly known as "reinforced plastics". The reinforcers usually used for this purpose are asbetos, cotton, jute and above all glass, either in fibre or fabric form.

Various methods are known for moulding reinforced unsaturated polyester resins, which generally consist of arranging a reinforcing agent in a suitable mould into which the liquid resin containing the hardening catalyst is poured, drawn by suction or injected. The hardening of the resin is then carried out at high temperature, possibly under pressure.

Examples of these methods are direct compression moulding, vacuum moulding and injection moulding. Direct moulding with preforming is also known and consists of moulding a "preform" obtained by suction deposition of resin-impregnated glass fibre in a suitable chamber followed by heat treatment in a current of air. These processes are somewhat onerous and do not allow high productivity of the moulded articles to be achieved. Moreover, the moulded objects have various undesirable characteristics, due, for example, to the smell of the unsaturated monomer used in the resin in combination with the product of the polycondensation of the polybasic unsaturated acids and the polyhydric alcohols. Finally there are various difficulties in handling substances such as unsaturated polyester resins.

The thermoplastic resins, unlike the thermosetting ones, can be moulded easily and quickly in apparatus in which they are first heated uniformly until they become fluid and are then injected into moulds in which hardening occurs. The application of such a method to thermosetting resins requires the availability of moulding compositions including the thermosetting resin, a hardening catalyst and inert fillers, having the following characteristics:

stability in storage for long periods at ambient temperature;

ability to change into the fluid state within a temperature range in which premature crosslinking and hardening do not occur appreciably;

ability to harden quickly and completely at temperatures above those necessary for fluidisation of the mass.

These moulding compositions should preferably be in the form of easily flowing granules having no tendency to release dust.

This combination of desirable characteristics has not, until now, been achieved in known moulding compositions which include a product of the polycondensation of alkylene glycols with unsaturated, dicarboxylic acids, and possibly also with aromatic dicarboxylic acids.

Moulding compositions including two different polyesters, a hardening catalyst and an inert filler, which are stable at ambient temperature, fluid within a range of temperature in which premature cross-linking and hardening do not occur and which are hardenable quickly at high temperature, have now been found. These compositions, in the form of free-flowing granules, free from a tendency to agglomerate or to release dust, can be moulded by known methods, including injection moulding, like thermoplastic materials. The moulded articles thus obtained have an unusual combination of properties.

Thus the invention provides a moulding composition comprising:

(a) from 10 to 50% by weight of a mixture of first and second polyesters, wherein the first polyester is the polycondensation product of an alkylene glycol with maleic and/or fumaric acid, having the following properties:

melting point (at the capillary): 130°–160° C.

acid value (mg KOH/g): 10–30

Brookfield viscosity at 160° C. (cps): 350–600 and the second polyester is the polycondensation product of an alkylene glycol with an aromatic dicarboxylic acid or a mixture thereof with maleic and/or fumaric acid, said mixture comprising at least 25% in moles of aromatic dicarboxylic acid and said second polyester having the following properties:

melting point (at the capillary): 65°–90° C.

acid value (mg KOH/g): 10–35

Brookfield viscosity at 160° C. (cps): 9,000–18,000, the first polyester being present in an amount of from 5 to 50 parts by weight for each 100 parts by weight of the sum of the first and second polyesters;

(b) from 0.2 to 2% by weight of an organic peroxide having a decomposition temperature above 70° C.; and (c) one or more inert fillers.

In addition to the polyesters, the peroxide and the inert fillers, the composition may also contain small amounts of conventional additives, such as polymerisation inhibitors, plasticizers, lubricants, dyes and pigments.

Preferably, the composition contains from 15 to 30% by weight of the first and second polyesters, the first polyester being present in an amount of from 20 to 35 parts by weight for every 100 parts by weight of the sum of the first and second polyesters. Moreover, the composition preferably contains from 0.5 to 1.8% by weight of organic peroxide.

FIRST POLYESTER

As previously stated, the first polyester is the polycondensation product of an alkylene glycol with maleic acid and/or fumaric acid. The preferred glycols are ethylene, propylene and butylene glycols.

The first polyester which is preferred for the purposes of the present invention is prepared from the monomers mentioned above and has properties within the following ranges of values:

| | |
|---|---|
| melting point | from 140 to 150° C. |
| acid value | from 15 to 25 |
| Brookfield viscosity (160° C.) | from 400 to 460 cps. |

In the preparation of the first polyester, the reagents are placed in contact and polycondensed at elevated temperature, while removing the water which forms in the reaction, until the preselected acid value is reached. The ratio between hydroxyl and acid equivalents in the reaction mixture is generally from 1.05:1 to 1.2:1.

According to a preferred embodiment the reaction is carried out at temperatures of from 190° to 210° C., water first being removed at atmospheric pressure until an acid value of 50–60 is reached and then at subatmospheric pressure and/or with the help of a stream of inert gas until the desired acid value is reached.

SECOND POLYESTER

As previously stated, the second polyester is the polycondensation product of an alkylene glycol with a dicarboxylic aromatic acid or a mixture thereof with maleic and/or fumaric acid. Conveniently a mixture of said aromatic and unsaturated acids is used, containing from 25% to 75%, and preferably 35% to 65% in moles of said aromatic acid, best results being generally obtained with a mixture containing about 50% in moles of aromatic acid. The glycols are preferably chosen from those mentioned above and the aromatic acids from phthalic acid (or its anhydride), isophthalic acid and terephthalic acid.

The second polyester which is preferred for the purposes of the present invention is prepared from the monomers mentioned above and has properties within the following ranges of values:

| | |
|---|---|
| melting point | from 75 to 80° C. |
| acid value | from 20 to 30 |
| Brookfield viscosity (160° C.) | from 10,000 to 14,000 cps. |

The conditions for the preparation of the second polyester are similar to those described for the first polyester, except for the fact that the temperature during polycondensation is preferably maintained at values of from 230° to 240° C.

ORGANIC PEROXIDE

The organic peroxide has a decomposition temperature greater than 70° C. and preferably greater than 120° C. The peroxide may be chosen from a wide class of compounds such as, for example: dialkyl peroxides (such as di-tertbutyl peroxide); diaralkyl peroxides (such as dicumyl peroxide); peroxy esters (such as tert-butyl peroxybenzoate and di-tert-butyl perphthalate) and ketal-type peroxides, such as that known commercially as "Trigonox 17/40".

The latter is usually used in combination with known polymerisation accelerants, such as the cobalt, manganese, cerium, nickel and iron salts of organic acids, and especially the naphthenate and octoate of cobalt.

THE INERT FILLERS AND THE OTHER CONSTITUENTS OF THE MOULDING COMPOSITIONS

The inert fillers are preferably silica, calcium carbonate, asbestos and glass fibre. The latter is generally present in the compositions in amounts of from 10 to 55% by weight, particularly in the form of fibres of the order of 3–10 mm in length.

The composition of the present invention may contain small amounts (0.5–2% by weight) of monomeric substances acting as plasticizing and fluidising agents, such as, for example, diallyl phthalate, acrylamide or N-substituted acrylamides.

The composition generally contains from 20 to 500 ppm (with respect to the polyesters) of one or more substances chosen from those usually used in the art to inhibit the polymerisation of the unsaturated polyester resins. These inhibitors may be chosen from a wide class of compounds such as: quaternary ammonium salts, salts of amines, copper salts, nitrophenols, dihydric phenols and their alkyl derivatives.

The moulding composition generally contains from 1 to 3% by weight of a lubricant, preferably chosen from waxes, stearic acid and zinc, calcium and magnesium stearates. Further additives generally present in the composition are dyes and pigments.

PREPARATION OF THE MOULDING COMPOSITION

The moulding composition of the present invention may be prepared in the following manner. All the components, except the glass fibre, are loaded into a ball mill and ground to a grain size of less than 100 microns. The glass fibre is then added, the mass is homogenised in a powder mixer under conditions such as not to break the glass fibres and the homogenised mass is calendered for times of the order of a few minutes and with roller temperatures not exceeding 100° C., until a sheet having a thickness of the order of 1 mm is obtained.

This latter is ground, for example, in a hammer mill, and the granules obtained are sieved to separate the fraction having the desired grain size (from 100 to 5,000 microns).

In an alternative method of preparation, after homogenisation with the glass fibre, the composition is extruded and the granulate is obtained by "in-head cutting" of the extrudate.

The present invention is based essentially on the use of different polyesters mixed together in well defined proportions, for the preparation of the moulding composition. It should be noted that if solely the first polyester (unsaturated polyester) is present in the moulding composition, the moulded articles have poor mechanical properties, especially poor bending strength and impact strength.

When using solely the second polyester (unsaturated polyester or saturated polyester according to whether maleic or fumaric acid is present or not), the moulded articles have also poor mechanical properties. Moreover, in time, the composition loses its flow properties and tends to agglomerate.

The moulding composition of the present invention maintains its flow and stability properties over prolonged periods. Moreover, it yields moulded articles with very good properties, especially the mechanical properties, which, in view of the properties of articles obtained from compositions including a single polyester, were not foreseeable.

In particular the composition is stable at ambient temperatures for periods of from 6 to 12 months and typically become fluid and flowing at temperatures of the order of 120° C. At these temperatures the "plastic life" or working time is greater than 80 seconds. Hardening typically occurs at temperatures of from 150° C. to 170° C. in times of the order of 70 to 45 seconds/mm of thickness.

In the experimental examples which follow, the parts and percentages are given by weight unless otherwise indicated.

EXAMPLE 1

46.9 parts of terephthalic acid, 2.78 parts of butane-1,4-diol, and 37.7 parts of ethylene glycol, are loaded into a flask provided with an agitator, while flowing nitrogen. The catalyst, stannous dibutyl oxide, is then added in an amount of 0.1% of the reagent mixture. While still operating in an atmosphere of nitrogen, the mixture is heated to 230°–240° C., a temperature not greater than 105° C. being maintained at the swan neck. These conditions are maintained until the acid value has fallen below 50.

The mass is then cooled in the flask to 180° C. and 33.5 parts of fumaric acid and 50 ppm of hydroquinone are added. The mass is heated to 200° C., the temperature still being maintained at less than 105° C. at the swan neck, and these conditions are maintained until the acid value is of the order of 50–60. A flow of nitrogen is then passed through the mass and these conditions are maintained until the acid value is 20–25 and the Brookfield viscosity at 160° C. is of the order of 10,000–12,000 cps. Finally the mass is cooled to 150° C. and discharged.

The characteristics of the unsaturated polyester obtained (polyester A) are summed up in Table 1, which lists the constituents of the polyester, in percentages by weight, together with the following properties:

acid value: expressed as milligrams of potassium hydroxide needed to neutralise 1 gram of polyester;

melting point: in °C. determined by the capillary method;

Brookfield viscosity determined on the polyester at 160° C., expressed in cps.

EXAMPLE 2

The reaction is carried out as in Example 1, using 24.5 parts of terephthalic acid, 27.6 parts of butane-1,4-diol, 19.7 parts of ethylene glycol, 47 parts of fumaric acid and 100 ppm of hydroquinone.

The characteristics of the unsaturated polyester obtained are given in Table 1 under polyester B.

EXAMPLE 3

56 parts of butane-1,4-diol and 65.6 parts of fumaric acid, together with the antioxidant hydroquinone in an amount of 500 ppm with respect to the reagents are loaded into a flask provided with an agitator, while flowing nitrogen.

Still in an atmosphere of nitrogen, the mass is heated to 200° C., the temperature of the swan neck being kept below 105° C. and these conditions are maintained until the acid value is 50 to 60. A flow of nitrogen is then passed through the mass until the acid value is of the order of 20–25 and the Brookfield viscosity at 160° C. is of the order of 400 cps. The mass is finally cooled to 180° C. and discharged.

The characteristics of the unsaturated polyester obtained are given in Table 1 under C. The said polyester has an opaque, white colour at 25° C. and is limpid and transparent at 150° C.

EXAMPLE 4

The reaction is carried out as in Example 1, using 49.3 parts of terephthalic acid, 39.5 parts of ethylene glycol and 32 parts of fumaric acid and adding 100 ppm of hydroquinone.

The characteristics of the unsaturated polyester obtained are given in Table 1 under polyester D.

EXAMPLE 5

95 parts of polyester D and 5 parts of polyester C are mixed. The resulting unsaturated polyester has the characteristics given in Table 1 under polyester E.

EXAMPLE 6

50 parts of polyester D and 50 parts of polyester C are mixed. The resulting unsaturated polyester has the characteristics given in Table 1 under polyester F.

EXAMPLE 7

75 parts of polyester D and 25 parts of polyester C are mixed. The resulting unsaturated polyester has the characteristics given in Table 1 under G.

COMPOSITION A

A moulding composition including the polyester A is prepared, the other components and their percentages being given in Table 2 under composition A.

In this table, DAP means the diallyl phthalate monomer and the glass fibre is of the "chopped strand" (7 mm) type. In the preparation of the composition, the resin is ground to a grain size less than 500 microns.

All the components except the glass fibre are then loaded into a Werner mixer and are mixed until they are perfectly homogenised. The glass fibre is then added and the mass is homogenised for about 2 minutes.

The homogenised mass is then calendered under the following conditions:

temperature of the first roller: 70° C.
temperature of the second roller: 50° C.
working time: 2 minutes
thickness of the sheet produced: 1 mm.

The sheets produced in the calender are ground in a hammer mill provided with a grid of mesh size 5 mm.

The characteristics of the granulated products produced are given in Table 2 under composition A.

In particular, there are recorded the values of the:

apparent density, in grams/liter, according to the DIN 53,468 standard;

hardening time, expressed in seconds. This determination is carried out by placing the composition in a mould in the form of a bowl of the UNI 4272 type and subjecting it to a load of 5,000 Kg at a temperature of 150° C.; the time between the closing of the mould and the formation of a bowl free from superficial defects (bubbles) is defined as the hardening time.

Flow index expressed in seconds. This determination is carried out in a similar manner to that described above, the composition being placed in a bowl shaped mould of the UNI 4272 type at a temperature of 150° C. and a load of 5,800 Kg being applied by means of an hydraulic press; at the moment at which the needle of the pressure gauge connected to the press shows an increase in pressure, the chronometer is started; when the upper plane of the press has finished its descent the chronometer is stopped; the time which has elapsed, expressed in seconds, is the flow index.

Packing expressed as a percentage by weight. This determination is carried out by placing 100 grams of the granulated product in a 250 ml beaker having an internal diameter of 66 mm, at a temperature of 35° C. and subjecting it to a pressure of 450 g/cm$^2$.

After 5 days the composition is sieved and the percentage of material remaining on the sieve is measured.

COMPOSITION B

Since the polyester B is liquid, this polyester is heated to 100° C. and the calcium carbonate is then added.

The mass is cooled and ground after the addition of the other components except the glass fibre. The glass fibre is then added and, after homogenisation, the mixture is calendered, the temperature of the first roller being maintained at 80° C. and the second roller being maintained at 45° C., the other conditions being the same as those described for composition A.

The calendered sheets are cooled to room temperature and ground in a hammer mill as described above.

The granulated product obtained is plastic and tacky. The characteristics are given in Table 2 under composition B.

COMPOSITION C

The polyester C is ground in a ball mill until it has a grain size less than 100 microns and the other components of the composition, except the glass fibre, are then added. The mixture is ground in the same mill for 15 minutes and is then discharged. The glass fibre is added and the mixture is homogenised in a Werner mixer for 2 minutes.

Calendering is then carried out at a temperature of the first roller of 140° C. and of the second roller of 135° C., the other conditions being the same as those used for the previous compositions.

A granulated product is obtained having characteristics given in Table 2 under Composition C, and having the following distribution of grain sizes:

| Mesh number | |
|---|---|
| 4 | 0% |
| 24 | 40% |
| 140 | 30% |
| 590 | 10% |
| 1600 | 15% |
| 3300 | 1% |
| residue | 4% |

COMPOSITION D

This composition is prepared from polyester D. The manner of preparation is exactly the same as that used for composition A.

The results are recorded in Table 2 under Composition D.

COMPOSITION E

This composition is prepared starting from polyester E. The manner of preparation is exactly the same as that used for composition A. The results are recorded in Table 2 under Composition E.

COMPOSITION F

The composition is prepared starting from polyester F. The method of preparation is exactly the same as that used for composition A.

The results are recorded in Table 2 under composition F.

COMPOSITION G

The composition is prepared starting from polyester G. The method of preparation is exactly the same as that used for Composition A.

The results are recorded in Table 2 under composition G.

MOULDED PRODUCTS A–G

The composition A is moulded into test bars having dimensions $10 \times 15 \times 120$ mm, according to the UNI standard, under the following conditions: temperature $160° \pm 2°$ C., pressure 200 Kg/cm$^2$, time 60 seconds/mm of thickness.

The characteristics of the test bars are determined after 24 hours and the values are recorded in Table 3 under moulded product A.

The compositions B to G are tested in exactly the same manner and the characteristics are recorded in Table 3 under moulded products B to G.

TABLE 1

| | Polyester | | | | | | |
|---|---|---|---|---|---|---|---|
| | A | B | C | D | E | F | G |
| Terephthalic acid | 38.8 | 20.6 | — | 40.8 | 38.8 | 20.4 | 30.6 |
| Ethylene glycol | 31.2 | 23.2 | — | 32.7 | 31.1 | 16.4 | 24.6 |
| Butane-1,4-diol | 2.3 | 16.6 | 46.1 | — | 2.2 | 23.0 | 11.5 |
| Fumaric acid | 27.7 | 39.6 | 53.9 | 26.5 | 27.9 | 40.2 | 33.3 |
| Acid value | 22 | 22.4 | 22 | 27 | 26.7 | 24.5 | 25.7 |
| Melting point | 65–68 | 15 | 140–145 | 75–78 | 79–83 | 130 | 105–110 |
| Viscosity | 11,600 | 390 | 430 | 12,000 | — | — | — |

TABLE 2

| Composition | A | B | C | D | E | F | G |
|---|---|---|---|---|---|---|---|
| Polyester | 20 | 20 | 20 | 20 | 20 | 20 | 20 |
| Zinc stearate | 2 | 2 | 2 | 2 | 2 | 2 | 2 |
| Dicumyl peroxide | 0.64 | 0.64 | 0.64 | 0.64 | 0.64 | 0.64 | 0.64 |
| DAP | 1 | 1 | 1 | 1 | 1 | 1 | 1 |
| Calcium carbonate | 66.36 | 66.36 | 66.36 | 66.36 | 66.36 | 66.36 | 66.36 |
| Glass fibre | 10 | 10 | 10 | 10 | 10 | 10 | 10 |
| Apparent density | 900 | 900 | 900 | 900 | 900 | 900 | 900 |
| Hardening time | 60 | 60 | 60 | 60 | 60 | 60 | 60 |
| Flow index | 8 | 10 | 8 | 8 | 8 | 8 | 8 |
| Packing | 100 | 100 | 0 | 50 | 0 | 0 | 0 |

TABLE 3

| | Moulded Product A | Moulded Product B | Moulded Product C | Moulded Product D | Moulded Product E | Moulded Product F | Moulded Product G |
|---|---|---|---|---|---|---|---|
| Shrinkage (%) DIN 53464 | 0.3 | 0.3 | 0.35 | 0.25 | 0.30 | 0.31 | 0.30 |
| Post-shrinkage (%) DIN 53464 | 0.07 | 0.07 | 0.07 | 0.07 | 0.07 | 0.04 | 0.06 |
| Bending strength (Kg/cm$^2$) DIN 53453 | 400 | 280 | 220 | 450 | 440 | 390 | 420 |
| Impact strength (Kg . cm/cm$^2$) DIN 53453 | 4.1 | 3.4 | 3.7 | 4.0 | 4.0 | 3.9 | 3.9 |
| Impact strength with notching (Kg cm/cm$^2$) DIN 53453 | 3.2 | 2.8 | 2.5 | 3.5 | 3.4 | 3.1 | 3.3 |
| Martens degree (°C.) DIN 53458 | 90 | 107 | 225 | 97 | 120 | 203 | 175 |
| Surface resistivity | | | | | | | |

TABLE 3-continued

|  | Moulded Product A | Moulded Product B | Moulded Product C | Moulded Product D | Moulded Product E | Moulded Product F | Moulded Product G |
|---|---|---|---|---|---|---|---|
| (ohm) DIN 53482 | $10^{13}$ | $10^{13}$ | $10^{13}$ | $10^{13}$ | $10^{13}$ | $10^{13}$ | $10^{13}$ |
| Volume resistivity (ohm/cm) DIN 53482 | $10^{14}$ | $10^{14}$ | $10^{14}$ | $10^{14}$ | $10^{14}$ | $10^{14}$ | $10^{14}$ |
| Dissipation factor (Kg 6) DIN 53483 | 0.01 | 0.01 | 0.01 | 0.01 | 0.01 | 0.01 | 0.01 |
| Tracking resistance DIN 53480 | KA 3C | KA 3C | KA 3C | KA 3C | KA 3C | KA 3C | KA 3C |
| Water absorption (mg) | 30 | 30 | 30 | 30 | 30 | 30 | 30 |
| Degree of incandescence DIN 53459 (degree) | 2 | 2 | 2 | 2 | 2 | 2 | 2 |

We claim:

1. A granular moulding composition in the form of free-flowing granules which are free from a tendency to agglomerate or release dust and which is suitable for injection, which composition consists essentially of: (a) from 10 to 50% by weight of a mixture of first and second polyesters, wherein the first polyester is the polycondensation product of an alkylene glycol with maleic and/or fumaric acid, having the following properties:
melting point (at the capillary): 130°–160° C.
acid value (mg KOH/g): 10–30
Brookfield viscosity at 160° C. (cps): 350–600 and the second polyester is the polycondensation product of an alkylene glycol with an aromatic dicarboxylic acid or a mixture thereof with maleic and/or fumaric acid, said mixture comprising at least 25% in moles of aromatic dicarboxylic acid and said second polyester having the following properties:
melting point (at the capillary): 65°–90° C.
acid value (mg KOH/g): 10–35
Brookfield viscosity at 160° C. (cps): 9,000–18,000, the first polyester being present in an amount of from 5 to 35 parts by weight for each 100 parts by weight of the sum of the first and second polyesters, balance being second polyester;
(b) from 0.2 to 2% by weight of an organic peroxide having a decomposition temperature above 70° C.;
(c) one or more inert fillers, said composition becoming fluid and flowing at a temperature on the order of 120° C. and hardening at a temperature of from 150° to 170° C.; and
(d) from 0.5 to 2% by weight of plasticizing and fluidizing agents selected from the group consisting of diallyl phthalate, acrylamide and N-substituted acrylamides.

2. The moulding composition of claim 1, which comprises from 15 to 30% by weight of said first and second polyesters and from 0.5 to 1.8% by weight of said organic peroxide, the first polyester being present in an amount of from 20 to 35 parts by weight for each 100 parts by weight of the sum of the first and second polyesters.

3. The moulding composition of claim 1, wherein the first polyester has a melting point of from 140° to 150° C., an acid value of from 15 to 25 and a Brookfield viscosity at 160° C. of from 400 to 460 cps.

4. The moulding composition of claim 1, wherein the second polyester has a melting point of from 75° to 80° C., an acid value of from 20 to 30 and a Brookfield viscosity at 160° C. of from 10,000 to 14,000 cps.

5. The moulding composition of claim 1, wherein said alkylene glycol is selected from the group consisting of ethylene, propylene and butylene glycols.

6. The moulding composition of claim 1, wherein said aromatic bicarboxylic acid is selected from the group consisting of phthalic, isophthalic and terephthalic acids.

7. The moulding composition of claim 1, wherein said second polyester is the polycondensation product of an alkylene glycol with a mixture of an aromatic dicarboxylic acid and maleic and/or fumaric acid, said mixture comprising from 35 to 65% in moles of aromatic dicarboxylic acid.

8. The moulding composition of claim 1, wherein said organic peroxide is selected from the group consisting of dialkyl peroxides, di-aralkyl peroxides, peroxy esters and ketal peroxides.

9. The moulding composition of claim 1, wherein said organic peroxide has a decomposition temperature above 120° C.

10. The moulding composition of claim 1, wherein said inert fillers are selected from the group consisting of silica, calcium carbonate, asbestos and glass fibre.

11. The molding composition of claim 1, which further contains from 20 to 500 ppm with respect to the polyesters, of a polymerization inhibitor selected from the group consisting of quaternary ammonium salts, salts of amines, copper salts, nitrophenols, dihydric phenols and their alkyl derivatives.

12. The moulding composition of claim 1, which further contains from 1 to 3% by weight of a lubricant selected from the group consisting of waxes, stearic acid and stearates of zinc, calcium and magnesium.

* * * * *